United States Patent
Clinton et al.

(10) Patent No.: US 10,793,466 B2
(45) Date of Patent: Oct. 6, 2020

(54) NANOPARTICLE ADDITIVES FOR SILICA SOOT COMPACTS AND METHODS FOR STRENGTHENING SILICA SOOT COMPACTS

(71) Applicant: Corning Incorporated, Corning, NY (US)

(72) Inventors: Joel Edward Clinton, Waverly, NY (US); Yunfeng Gu, Painted Post, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 377 days.

(21) Appl. No.: 15/052,309

(22) Filed: Feb. 24, 2016

(65) Prior Publication Data

US 2016/0251252 A1    Sep. 1, 2016

Related U.S. Application Data

(60) Provisional application No. 62/121,728, filed on Feb. 27, 2015.

(51) Int. Cl.
*C03B 37/012* (2006.01)
*C03B 19/06* (2006.01)

(52) U.S. Cl.
CPC ...... *C03B 37/01282* (2013.01); *C03B 19/066* (2013.01)

(58) Field of Classification Search
CPC .......... C03B 37/01282; C03B 19/066
See application file for complete search history.

(56) References Cited

U.S. PATENT DOCUMENTS

| | | | |
|---|---|---|---|
| 3,177,057 A | 4/1965 | Potter et al. |
| 3,686,006 A | 8/1972 | Horton |
| 4,364,883 A | 12/1982 | Shannon |
| 4,501,601 A | 2/1985 | Haupt |
| 4,569,920 A | 2/1986 | Smith-Johannsen |
| 4,620,862 A | 11/1986 | Dorn et al. |
| 4,867,774 A | 9/1989 | Dorn |
| 5,185,020 A | 2/1993 | Satoh et al. |
| 5,215,564 A | 6/1993 | Weber |
| 5,236,481 A | 8/1993 | Berkey |
| 5,240,488 A | 8/1993 | Chandross et al. |
| 5,244,485 A | 9/1993 | Hihara et al. |
| 5,261,938 A | 11/1993 | Kitamura et al. |

(Continued)

FOREIGN PATENT DOCUMENTS

| | | |
|---|---|---|
| EP | 127956 A1 | 12/1984 |
| EP | 0652184 A1 | 5/1995 |

(Continued)

OTHER PUBLICATIONS

Yoshida, Satoh, Enomoto; Yagi; Hihara; Oku; "Fabrication of large performs for low-loss single-mode optical fibers by a hybridized process" Glastech Berichte Glass Sci. Techno, 69 (12) 1996 p. 412-416.

(Continued)

*Primary Examiner* — Mathieu D Vargot
(74) *Attorney, Agent, or Firm* — Amy T. Lang

(57) ABSTRACT

A method of strengthening a silica soot compact is provided. The method includes forming a mixture of silica soot particles and nanoparticles, and forming a silica soot compact from the mixture.

19 Claims, 6 Drawing Sheets

(56) References Cited

U.S. PATENT DOCUMENTS

| | | |
|---|---|---|
| 5,314,520 A | 5/1994 | Yagi et al. |
| 5,318,432 A | 6/1994 | Yagi et al. |
| 5,352,259 A | 10/1994 | Oku et al. |
| 5,562,752 A | 10/1996 | Fleming, Jr. |
| 5,711,215 A | 1/1998 | Sextl et al. |
| 5,885,493 A | 3/1999 | Janney et al. |
| 5,922,272 A | 7/1999 | Sambrook et al. |
| 6,223,563 B1 | 5/2001 | Bahr, Jr. et al. |
| 6,340,650 B1 | 1/2002 | Haun |
| 7,140,202 B2 | 11/2006 | Freund et al. |
| 7,384,470 B2 | 6/2008 | Binkle et al. |
| 7,452,518 B2 | 11/2008 | Hansen et al. |
| 7,476,474 B2 | 1/2009 | Ganguli et al. |
| 7,647,792 B2 | 1/2010 | Ichii et al. |
| 8,578,736 B2 | 11/2013 | Dawes et al. |
| 8,869,566 B2 | 10/2014 | Allen et al. |
| 8,904,828 B2 | 12/2014 | Dawes et al. |
| 2002/0157418 A1 | 10/2002 | Ganguli et al. |
| 2002/0192366 A1 | 12/2002 | Cramer et al. |
| 2004/0060327 A1* | 4/2004 | Berkey ............ C03B 37/01446 65/422 |
| 2005/0220692 A1 | 10/2005 | Mangold et al. |
| 2006/0115913 A1 | 6/2006 | Orita et al. |
| 2008/0160302 A1* | 7/2008 | Asrar ........................ C08J 5/08 428/375 |
| 2008/0285930 A1 | 11/2008 | Gasca et al. |
| 2009/0116798 A1* | 5/2009 | Blanchandin ............ C03C 3/06 385/123 |
| 2010/0071421 A1 | 3/2010 | Dawes et al. |
| 2010/0107700 A1 | 5/2010 | Dawes et al. |
| 2010/0290041 A1* | 11/2010 | Graham .................. C03B 23/04 356/246 |
| 2011/0100063 A1 | 5/2011 | Desorcie et al. |
| 2011/0116160 A1* | 5/2011 | Boivin .............. C03B 37/01838 359/341.3 |
| 2012/0047959 A1* | 3/2012 | Allen ................ C03B 37/01282 65/421 |
| 2012/0100373 A1 | 4/2012 | Shinbach et al. |
| 2012/0193762 A1* | 8/2012 | Lin ........................ B82Y 10/00 257/618 |
| 2013/0045854 A1 | 2/2013 | Coapes et al. |
| 2013/0216820 A1* | 8/2013 | Riddle .................... C09D 4/00 428/313.9 |
| 2014/0363670 A1 | 12/2014 | Bookbinder et al. |

FOREIGN PATENT DOCUMENTS

| | | |
|---|---|---|
| JP | 59019891 A | 5/1984 |
| JP | 61256937 A | 11/1986 |
| JP | 62027341 A | 2/1987 |
| JP | 63055132 A | 3/1988 |
| JP | 04325430 | 11/1992 |
| JP | 05294658 A | 11/1993 |
| JP | 05294659 A | 11/1993 |
| JP | 05345628 A | 12/1993 |
| JP | 6048758 A | 2/1994 |
| JP | 06080436 A | 3/1994 |
| JP | 2007230814 A | 9/2007 |
| JP | 2008266087 A | 11/2008 |

OTHER PUBLICATIONS

Yoshida, Satoh, Enomoto; Yagi; Hihara; Oku; "Hybridised Fabrication Process for Optical Fibres" Electronics Letters; vol. 32; No. 3; Feb. 1996; p. 242.

Yoshida, Satoh, Enomoto; Yagi; Hihara; Oku; "Fracture Origins of Optical Fibers Fabricated by Hybridized Process" E Journal of Lightwave Technology; vol. 14; No. 11; Nov. 1996; pp. 2506-2512.

Clasen, "Preparation and Sintering of High-Density Green Bodies to High-Purity Silica Glasses" Journal of Non-Crystalline Solids; vol. 89; 1987; pp. 335-344.

Dorn, "0.27-dB/km Attenuation Achieved by MSP Preform Process" Journal of Lightwave Technology; vol. 9; No. 6; Jun. 1991; pp. 709-714.

Dorn, "Mechanically Shaped Preforms for Optical Fiber Production" 1225 Electrical Communication; vol. 59; No. 4; 1985; pp. 396-400.

European Patent Office, Notification of Transmittal of the International Search Report; dated Jun. 20, 2016 re: PCT/US2016/019212, filed Feb. 24, 2016, 1 page.

European Patent Office, International Search Report and Written Opinion of the International Search Report; dated Jun. 20, 2016 re: PCT/US2016/019212, filed Feb. 24, 2016, 11 pages.

* cited by examiner

NANOPARTICLE ADDITIVES FOR SILICA SOOT COMPACTS AND METHODS FOR STRENGTHENING SILICA SOOT COMPACTS

This application claims the benefit of priority to U.S. Application No. 62/121,728 filed on Feb. 27, 2015 the content of which is incorporated herein by reference in its entirety.

FIELD

The present disclosure relates generally to methods for forming optical quality glass, and in particular, to methods for forming silica soot compacts.

BACKGROUND

Silica soot particles are a by-product of high purity fused silica glass making processes. For example, conventional chemical vapor deposition (CVD) processes for making optical fiber preforms, such as outside vapor deposition (OVD) and vapor axial deposition (VAD) processes, often utilize only a portion of the starting raw material due to limitations in the deposition efficiency of the processes. Use of the resulting "waste" silica soot in forming optical quality glass could, therefore, potentially result in significant raw material cost savings.

Accordingly, different methods have been devised to utilize otherwise unutilized silica soot in the production of optical quality glass. These methods, which include, for example, sol-gel (and other "wet") processes, can suffer from a variety of drawbacks including expensive, complicated, and/or time consuming processing conditions and equipment, and may result in soot compacts with less than desirable properties such as unacceptable variability with respect to compact density and geometry. These less than desirable properties adversely affect compact strength and can result in cracking, breaking or other types of soot compact failure.

According to one method, soot compact strength may be improved by increasing the water content in a silica soot sample. However, as water is volatile, and can be difficult to distribute throughout the silica soot sample, even an initially well distributed water supply is subject to drying and loss of cohesive strength over time. As a result of compaction that occurs as the meniscus force of the drying draws particles together, agglomerated soot that retains high density in the silica soot are formed. These agglomerates adversely affect soot compact strength and may lead to the formation of pores in the resultant glass.

Organic additives may also be effective in strengthening soot compacts. However, removal of organic additives from high purity silica soot can be difficult to achieve and may necessitate additional high temperature processing steps. If unsuccessfully removed, the organic additives may become trapped in the silica soot through consolidation and may form pores in the resultant glass. Still other additives that may improve soot compact strength require a high temperature active oxidation or chlorination to be removed from the silica soot. At the temperatures required for removal, these additives may interact with the silica surface of the silica soot and initiate irreversible crystallization.

SUMMARY

According to an embodiment of the present disclosure, a method of strengthening a silica soot compact is provided.

The method includes forming a mixture of silica soot particles and nanoparticles, and forming a silica soot compact from the mixture.

According to another embodiment of the present disclosure, a method of forming a cladding portion of an optical fiber preform is provided. The method includes positioning a partially manufactured optical fiber preform in an inner cavity of a mold body, and contacting silica soot particles with nanoparticles. The method further includes, after contacting the silica soot particles with the nanoparticles, loading the mold body with the silica soot particles, and compressing the silica soot particles in a radial direction to form a silica soot compact.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1:
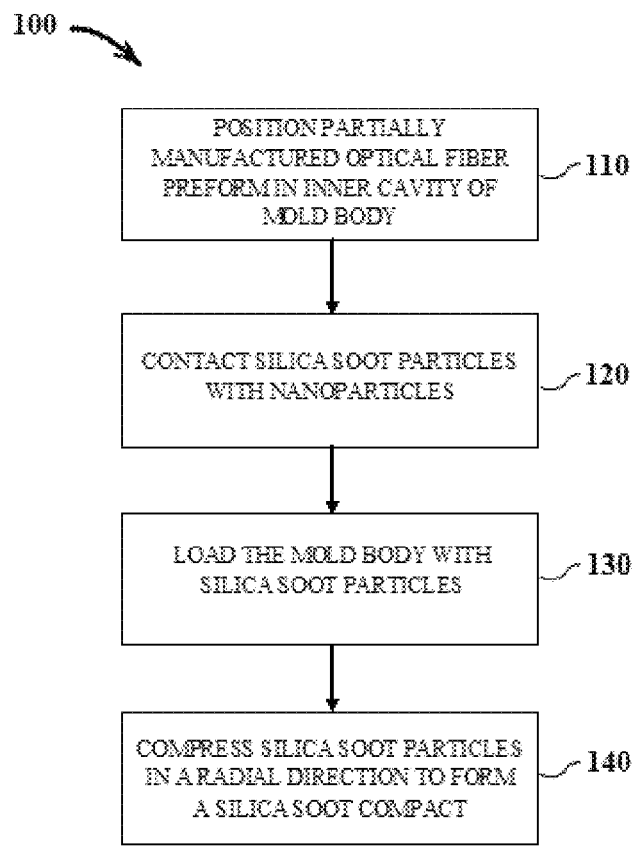
FIG. 1 illustrates a method of forming a cladding portion of an optical fiber preform in accordance with embodiments of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

According to an embodiment of the present disclosure, a method of strengthening a silica soot compact is provided. The method includes forming a mixture of silica soot particles and nanoparticles and forming a silica soot compact from the mixture. As described herein, the term silica soot particles refers to amorphous soot particulate material made of silica or silica doped with dopants such as, but not limited to, germania, phosphorus, fluorine, titania, chlorine, and so forth. The silica soot particles may have a size of between about 0.05 micron and about 0.4 micron with an average particle size of about 0.2 micron. The particulate surface area of the silica-based soot particles may be greater than about 15 $m^2/g$, more preferably greater than about 17 $m^2/g$, even more preferably greater than about 20 $m^2/g$, and even greater than about 50 $m^2/g$. The particulate surface areas may be as high as about 250 $m^2/g$ or more.

Embodiments of the present disclosure include forming a mixture of silica soot particles and nanoparticles. As used herein, the term "nanoparticles" refers to particles having an average size between about 1.0 nm and about 100 nm. The particle size may be less than about 50 nm, for example between about 1.0 nm and about 50 nm, or less than about 30 nm, for example between about 1.0 nm and about 30 nm, or even less than about 20 nm, for example between about 1.0 nm and about 20 nm. According to embodiments of the present disclosure, the particle size of the nanoparticles may be between about 3.0 nm and about 20 nm, or even between about 6.0 nm and about 15 nm. The mixture may have a bulk density of less than about 0.30 $g/cm^3$. For example, the mixture may have a bulk density of between about 0.10 $g/cm^3$ and about 0.30 $g/cm^3$. The mixture of silica soot particles and nanoparticles may include between about 3.0 wt. % and about 30 wt. % of nanoparticles with the remainder being silica soot particles.

The nanoparticles may have a hydrophilic surface. By the term "hydrophilic", it is meant that the surface has a high affinity for water. Having an affinity for water allows the nanoparticles to absorb the water in the soot compact and avoid the effects that water has on the formation of agglomerated soot. As used herein, the phrase "agglomerated soot" refers to silica soot that has been treated by a process that induces formation of a distribution of larger agglomerated secondary particles, comprised of primary soot particles. The agglomerated secondary particles may be, for example, about 50 to about 5,000 times larger in diameter than the primary soot particles from which the secondary particles are formed. The agglomerated soot is characterized by weak attractive force between the primary particles, such as by Van der Waals forces, meniscus forces (e.g., water surface tension), or electrostatic forces. The agglomerated secondary particles can be returned to the original fumed silica state, for example by high impact powder milling or other dispersive methods.

The nanoparticles may also have a high surface area. The surface area of the nanoparticles may be, for example, between about 30 $m^2/g$ and about 450 $m^2/g$. Alternatively, the surface area of the nanoparticles may be, for example, between about 50 $m^2/g$ and about 400 $m^2/g$. Without wishing to be limited by any particular theory, it is believed that the high surface area of the nanoparticles contributes to increased tensile strength of the silica soot compacts. The high surface area of the nanoparticles increases particle-particle surface contact area and thus particle-particle adhesion force. Additionally, it is believed that the high surface area of the nanoparticles absorb more water at their surfaces to form surface layers of condensed water which also increase particle-particle surface contact area. Formation of molecular bonds between these surface layers of condensed water may also contribute to an increase in tensile strength of the silica soot compacts.

Embodiments of the present disclosure may optionally include humidifying the nanoparticles or humidifying the mixture of the silica soot particles and the nanoparticles. The nanoparticles or the mixture may be placed in a humidifying chamber to increase the moisture content of the nanoparticles or of the mixture. Humidifying the nanoparticles or the mixture may increase the moisture content of the nanoparticles of the mixture by less than about 5.0 wt. %. The moisture content of the nanoparticles or the mixture may be, for example, between about 0.10 wt. % and about 5.0 wt. %, or even between about 0.25 wt % and about 5.0 wt. %. As described hereinabove, increased moisture content increases formation of molecular bonds between surface layers of condensed water of the nanoparticles and further contributes to an increase in tensile strength of the silica soot compacts. A humidified gaseous carrier, such as air, steam, or another suitable carrier gas or mixture of carrier gases, may be passed through the humidifying chamber to increase the moisture content of the nanoparticles or of the mixture. In one exemplary embodiment, the humidifying chamber comprises a furnace coupled to a steam generator such that the steam generator supplies steam (i.e., a water-containing atmosphere) to the interior volume of the furnace. The steam may be directed into the furnace by itself or entrained in a carrier gas such as air, nitrogen, or the like. Alternatively, a hot water system may be used to create the water-containing atmosphere in the furnace. For example, a carrier gas may be bubbled through a heated water bath to humidify the carrier gas which, in turn, is directed into the furnace.

The nanoparticles may be for example, but without limitation, silica, germanium oxide, gallium oxide, antimony oxide, arsenic oxide, bismuth oxide, indium oxide, lead oxide, phosphorus oxide, tantalum oxide, tellurium oxide, tin oxide, titanium oxide, selenium oxide, and mixtures thereof.

The silica soot particles and nanoparticles may be mixed at any time prior to the formation of the silica soot compact. For example, the nanoparticles may be mixed with the silica soot particles while the silica soot particles are being collected, after the silica soot particles have been collected, or while the silica soot particles are being prepared for formation of the silica soot compact. The nanoparticles may be added to the silica soot particles by being brought into physical contact with the silica soot particles in the absence of a solvent. The nanoparticles may be distributed as a solute in a moisture layer on the silica soot particles. The nanoparticles may be brought into contact with silica soot particles by being injection or dry sprayed onto the silica soot particles during, for example, a collection step of a silica soot generation process or a collection step of a CVD process.

Embodiments of the present disclosure further include forming a silica soot compact from the mixture of silica soot particles and nanoparticles. Forming the silica soot compact may include, for example, adding the mixture of silica soot particles and nanoparticles to a mold of a predetermined shape and applying a pressure to the mixture of silica soot particles and nanoparticles in the mold. The pressure applied to the mixture of silica soot particles and nanoparticles to form the silica soot compact may be greater than about 100 psi. For example, the pressure applied to the mixture of silica soot particles and nanoparticles to form the silica soot compact may be between about 100 psi and about 500 psi.

The density of the silica soot compacts described herein is lower than the density of silica soot compacts formed without nanoparticles. The density is low enough to prevent the adverse effects of pore formation in resultant glass, but high enough to provide adequate yields of resultant glass from the silica soot compacts. According to embodiments of the present disclosure, the silica soot compact may have a density of less than about 1.20 g/cm$^3$. For example, the silica soot compact may have a density of between about 0.40 g/cm$^3$ and about 1.00 g/cm$^3$, or even between about 0.60 g/cm$^3$ and about 0.85 g/cm$^3$.

Silica soot compacts formed in accordance with embodiments of the present disclosure have increased strength as compared to silica soot compacts formed form silica soot particles alone. Such increased strength results in reduced compact failure resulting from handling and processing of the silica soot compacts. Silica soot compacts formed in accordance with embodiments of the present disclosure may have a tensile strength 25% greater than silica soot compacts formed form silica soot particles alone. Silica soot compacts formed in accordance with embodiments of the present disclosure may have a tensile strength 33% greater than silica soot compacts formed form silica soot particles alone. Silica soot compacts formed in accordance with embodiments of the present disclosure may have a tensile strength 50% greater than silica soot compacts formed form silica soot particles alone.

Additionally, the Young's modulus of the silica soot compacts described herein is lower than the Young's modulus of silica soot compacts formed without nanoparticles. The silica soot compact may have a Young's modulus of less than about 150 MPa. For example, the silica soot compact may have a Young's modulus of less than about 125 MPa, or even less than about 100 MPa. Without wishing to be limited by any particular theory, it is believed that the Young's modulus of the silica soot compacts as described herein is associated with an increased ability of the silica soot compacts to absorb stresses which are the result of processing steps. As such, the Young's modulus further contributes to reduced compact failure.

The relationship of both tensile strength and Young's modulus to reduced compact failure may be presented in terms of strain tolerance, where strain tolerance is the ratio of tensile strength to Young's modulus. As used herein, strain tolerance is a relationship of the combined contributions of withstanding an applied force and absorbing stress. Generally, the combination of increased tensile strength and decreased Young's modulus results in increased strain tolerance. The strain tolerance of the silica soot compacts described herein is greater than the strain tolerance of silica soot compacts formed without nanoparticles. The strain tolerance of the silica soot compact may be between about 2× greater to about 10× greater than the strain tolerance of a silica soot compact formed without nanoparticles. For example, the strain tolerance may be between about 2× and about 8×, or even between about 2× and about 5× greater than the strain tolerance of a silica soot compact formed without nanoparticles.

As described herein, examples of compact failure include cracking and breaking of the silica soot compact. Such compact failure may occur when the silica soot compact is physically moved after formation of the silica soot compact. Additionally, such compact failure may occur during processing steps which include heating of the silica soot compact. Such processing steps may include, but are not limited to, pre-heating the silica soot compact, heating the silica soot compact in a humidifying chamber, pre-sintering the silica soot compact, partially sintering the silica soot compact to modify the density of at least a part of the silica soot compact, or sintering the silica soot compact to form a consolidated glass article. Silica soot compacts formed in accordance with embodiments of the present disclosure may be heated to temperatures greater than about 200° C. without experiencing compact failure. Silica soot compacts formed in accordance with embodiments of the present disclosure may be heated to temperatures greater than about 500° C. without experiencing compact failure. Additionally, silica soot compacts formed in accordance with embodiments of the present disclosure may be heated to temperatures greater than about 900° C. without experiencing compact failure.

According to embodiments of the present disclosure, the silica soot compact may be sintered to form a glass article. The silica soot compact may be heated to a sintering temperature between about 1200° C. and about 1550° C. and maintained at the sintering temperature until the silica soot compact is consolidated into a glass article.

The silica soot particles disclosed herein may serve as precursors to optical quality glass. The silica soot particles may be pressed over the outer layer of a substrate to form at least a portion of an optical fiber preform to form a cladding portion of the optical fiber preform. As shown in FIG. 1, a method 100 for forming an optical fiber preform may include positioning 110 a partially manufactured consolidated or unconsolidated silica glass preform into an inner cavity of a mold body. The partially manufactured preform may include a soot region deposited via chemical vapor deposition processes such as OVD or VAD. The method 100 further includes contacting 120 silica soot particles with nanoparticles and loading 130 the mold body with the silica soot particles. Silica soot particles may be deposited into the inner cavity between the partially manufactured preform and an inner wall of the mold body. The method 100 further includes compressing 140 the silica soot particles in a radial direction to form a silica soot compact. A radially inward pressure may be applied against the particulate glass material to pressurize the particulate glass material against the soot region on the partially manufactured preform. Pressing methods and apparatuses disclosed in U.S. Pat. No. 8,578,736 and U.S. Publication No. 2010/0107700, the specifications of which are incorporated by reference in their entirety, may be employed.

EXAMPLES

Embodiments of the present disclosure are further described below with respect to certain exemplary and specific embodiments thereof, which are illustrative only and not intended to be limiting.

Example 1

Silica soot collected from a specialty silica soot generation system was used to form Sample A which included 100 wt. % of the silica soot. The same silica soot used to form Sample A was physically contacted with nanoparticles in the absence of a solvent to form Mixture 1. Mixture 1 included 94 wt. % silica soot and 6.0 wt. % nano-silica (commercially available from Sigma-Aldrich Co., having a particle size of about 7.0 nm and a surface area of about 395 m$^2$/g. Silica soot that was a by-product of a CVD process was used to Sample B which included 100 wt. % of the silica soot. The same silica soot used to form Sample B was physically contacted with nanoparticles in the absence of a solvent to form Mixture 2. Mixture 2 included 94 wt. % silica soot, and 6.0 wt. % of the nano-silica included in Mixture 1. All mixtures and samples were placed in a rolling container and rolled for two days at a rolling speed of about 15 rpm.

An MTS Insight Electromechanical Testing System (commercially available from MTS Systems Corporation, Eden Prairie, Minn.) was used to make pellets using the mixtures and samples described in this Example. For each mixture and each sample, approximately 6.0 grams of silica soot or silica soot/nanoparticle mixture were weighed and poured into a solid steel mold with an inner diameter of about 25.4 mm. The inside surface was polished, and snug fitting steel rams with a diameter of about 25.3 mm compacted the sample. Discs cut from laboratory weighing paper were used at ram/soot interfaces to prevent sticking. The pellet was compressed to a load of about 400 pounds force at a down drive rate of about 0.2 mm/sec., held for about 10 minutes, and released. The pellet was then extracted from the mold to be weighed, and the height of the pellet was measured to enable a calculation of pellet density. A diametric compression test was then run at a down drive rate of about 0.01 cm/min. The stress curve was observed in real time. Pellet density and tensile strength measurements are shown in Table I.

TABLE I

|  | Pellet Density (g/cm$^3$) | Tensile Strength (psi) |
|---|---|---|
| Sample A | 0.89 | 7.51 |
| Mixture 1 | 0.78 | 9.99 |
| Sample B | 0.91 | 5.63 |
| Mixture 2 | 0.78 | 7.05 |

The addition of nanoparticles to the silica soot results in a decrease in pellet density, but also an increase in tensile strength. As shown in Table I, an increase of about 33% in tensile strength was observed for Mixture 1 as compared to Sample A, and an increase of about 25% in tensile strength was observed for Mixture 2 as compared to Sample B.

Example 2

Two silica soot samples and one mixture of silica soot particles and nanoparticles were prepared. Sample C included silica soot particles having a particle size of between about 0.05 micron and about 0.4 micron, a surface area of about 21 m$^2$/g, and a moisture level of about 0.21 wt. %. Sample D included silica soot particles having a particle size of between about 0.05 micron and about 0.4 micron, a surface area of about 21 m$^2$/g, and a moisture level of about 0.49 wt. %. Mixture 3 included the same silica soot particles as included in Sample C and 6.0 wt. % of the nano-silica described in Example 1. Mixture 3 was formed by placing the silica soot particles and the nano-silica in an Acoustic Mixer (commercially available from Resodyn™ Acoustic Mixers, Inc. Butte, Mont.) for a period of about 1.0 minute. The moisture level of Mixture 3 was measured to be about 0.48 wt. %.

For each of Sample C, Sample D and Mixture 3, a set of six pellets were formed in accordance with the process described in Example 1. For each set of six pellets, tensile strength was measured at room temperature for three pellets without any additional processing. The other three pellets of each set of six pellets were heated to a temperature of about 200° C. for about 10 hours and, after cooling, tensile strength was measured. Tensile strength of the pellets was measured in accordance with the process described in Example 1.

Figure 2:
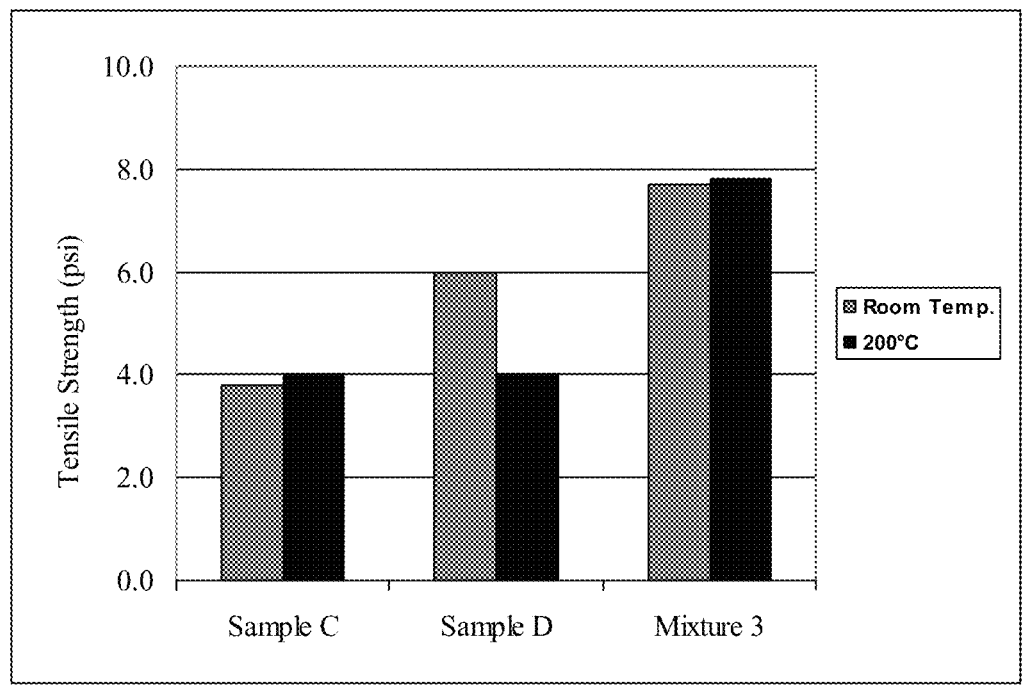
FIG. 2 is a graph showing tensile strength of silica soot pellets in accordance with the present disclosure.

FIG. 2 is a graph showing the tensile strength of the pellets described in this Example. As shown, Sample D had a greater tensile strength than Sample C at room temperature. However, pellets of Sample C and Sample D that were heated to 200° C. exhibited similar tensile strength. While the greater moisture level of Sample D provided increased tensile strength to the pellets at room temperature, heating the pellets removed the moisture and moisture level of the silica soot particles had little or no effect on tensile strength after heating was performed. In contrast, Mixture 3 exhibited higher tensile strength than both Sample C and Sample D at both room temperature and after being heated to 200° C. In view of the data shown in FIG. 2, it can be seen that the strengthening effect of nanoparticles is different than the strengthening effect of moisture alone. The high surface area of the nanoparticles increases particle-particle surface contact area and particle-particle adhesion force without being limited by the application of heat to the pellets.

Example 3

Mixtures 4-8, which included silica soot collected from a specialty silica soot generation system and the nano-silica used in Example 1, were formed using the mixing process described in Example 2. The mixtures were humidified to have a moisture level of about 1.0 wt. %. Concentrations of the silica soot and the nano-silica are shown in Table II.

TABLE II

|  | Silica Soot (wt. %) | Nano-silica (wt. %) |
|---|---|---|
| Mixture 4 | 97 | 3.0 |
| Mixture 5 | 94 | 6.0 |
| Mixture 6 | 90 | 10 |
| Mixture 7 | 85 | 15 |
| Mixture 8 | 80 | 20 |

Figure 3:
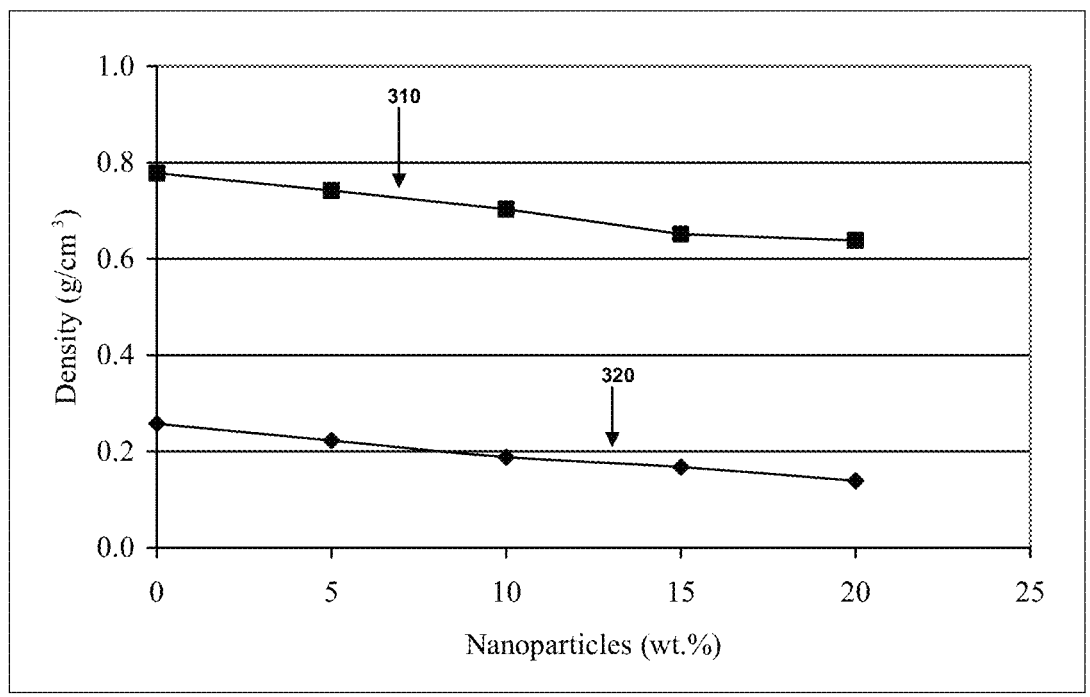
FIG. 3 is a graph showing soot bulk density and average pellet density of silica soot mixtures in accordance with the present disclosure.

The mixtures were placed in a rolling container and rolled for about 20 hours at a rolling speed of about 15 rpm. Prior to forming pellets, the soot bulk density of the mixtures was measured. For each mixture, as well as for Sample A from Example 1, three pellets were then formed in accordance with the processes described in Example 1 and pellet density and tensile strength were measured in accordance with the processes described in Example 1. Soot bulk density of the mixtures and average pellet density are shown in the graph of FIG. 3, with Line 310 showing average pellet density and Line 320 showing soot bulk density of the mixtures. As shown, both the soot bulk density and the average pellet density decrease with increasing nanoparticle concentration. An 80% reduction in soot bulk density from Sample A to Mixture 6 was observed and a 143% reduction in soot bulk density from Sample A to Mixture 8 was observed. An 18% reduction in average pellet density from Sample A to Mixture 6 was observed and a 30% reduction in average pellet density from Sample A to Mixture 8 was observed.

Example 4

Mixtures 9-12, which included silica soot collected from a specialty silica soot generation system and various nanoparticles, were formed. Concentrations of the silica soot and the nanoparticles are shown in Table III along with nanoparticle size and the measured Brunauer-Emmett-Teller (BET) surface area of the nanoparticles.

TABLE III

| | Nanoparticle Size (nm) | Nanoparticle Measured BET Surface Area (m²/g) | Silica Soot (wt. %) | Nanoparticles (wt. %) |
|---|---|---|---|---|
| Mixture 9 | 7.0 | 354.20 | 93 | 7.0 |
| Mixture 10 | 9.0 | 290.20 | 91 | 9.0 |
| Mixture 11 | 11 | 232.30 | 89 | 11 |
| Mixture 12 | 14 | 185.90 | 86 | 14 |

For each of Mixtures 9-12, a set of fifteen pellets were formed in accordance with the process described in Example 1, with the only difference being that the pellets were compressed to a load of about 190 pounds force at a down drive rate of about 0.2 mm/sec., held for about 4.0 minutes, and released. For each set of fifteen pellets, three pellets were heated to a temperature of about 20° C. for about 10 hours, then cooled to room temperature; three pellets were heated to a temperature of about 100° C. for about 10 hours, then cooled to room temperature; three pellets were heated to a temperature of about 200° C. for about 10 hours, then cooled to room temperature; three pellets were heated to a temperature of about 300° C. for about 10 hours, then cooled to room temperature; and three pellets were heated to a temperature of about 500° C. for about 10 hours, then cooled to room temperature.

Figure 4:
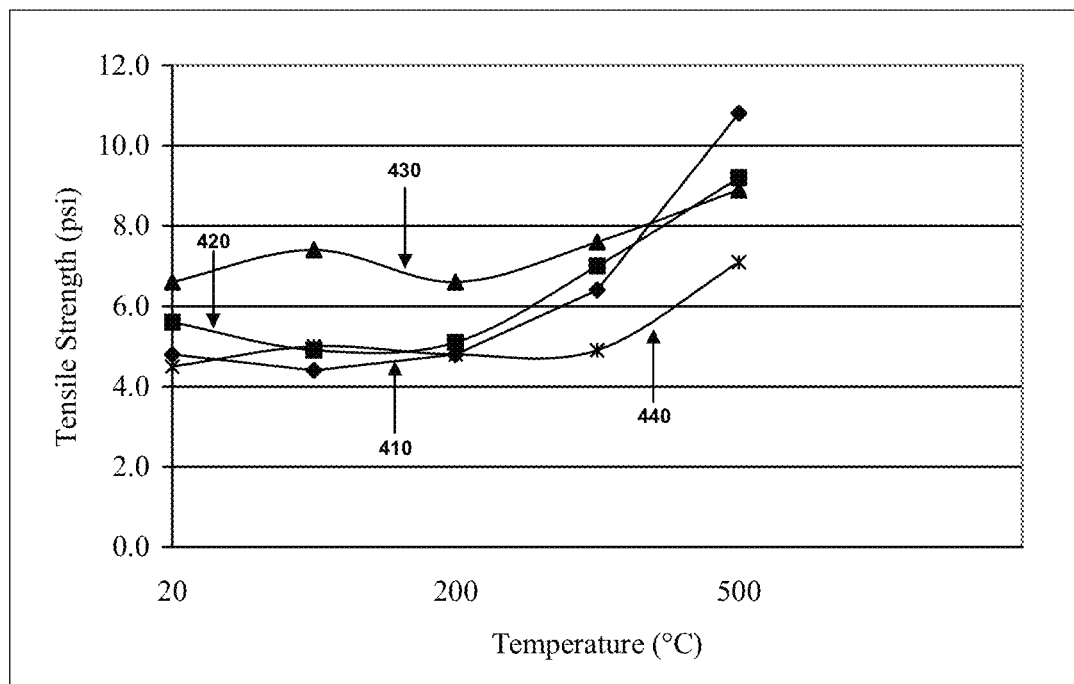
FIG. 4 is a graph showing average tensile strength of silica soot pellets in accordance with the present disclosure.

Tensile strength was measured in accordance with the processes described in Example 1, and the average tensile strength at each of the temperatures is shown in the graph of FIG. 4. In FIG. 4, Line 410 shows average tensile strength for Mixture 9, Line 420 shows average tensile strength for Mixture 10, Line 430 shows average tensile strength for Mixture 11 and Line 440 shows average tensile strength for Mixture 12.

As shown for each mixture having nanoparticles of different particle size, tensile strength generally increased with temperature. Each mixture exhibited the greatest tensile strength at 500° C. Generally, and particularly for pellets heated to temperatures above 100° C., tensile strength decreased with increasing nanoparticle size. As shown in FIG. 4, the slope of the tensile strength of the pellets heated to temperatures above 200° C. was related to nanoparticle size in accordance with the following trend: 7.0 nm>9.0 nm>11 nm≥14 nm. Additionally, as the measured BET surface area of the nanoparticles increased with decreasing nanoparticle size (as shown in Table III), this is in accord with the results of Example 2.

Example 5

Mixtures 13-16, which included 90 wt. % silica soot collected from a specialty silica soot generation system and 10 wt. % nanoparticles, were formed. In each of Mixtures 13-16, different nanoparticles were used with each of the nanoparticles having different particle size and different surface area. Mixture 13 included the nano-silica as used in Example 1. Mixtures 14-16 included fumed silica sold under the trade name Aerosil® (commercially available from Evonik Industries, Essen, Germany). The fumed silica of Mixture 14 had a particle size of about 20 nm and a surface area of about 90 m²/g, the fumed silica of Mixture 15 had a particle size of about 30 nm and a surface area of about 30 m²/g, and the fumed silica of Mixture 16 had a particle size of about 40 nm and a surface area of about 50 m²/g. The fumed silica of Mixtures 13, 14 and 16 had a hydrophilic surface and the fumed silica of Mixture 15 had a hydrophobic surface.

The mixtures were placed in a rolling container and rolled for about 20 hours at a rolling speed of about 15 rpm. The mixtures were then passed through a 313 μm mesh sieve to remove any agglomerated soot formed during the rolling process. For each mixture three pellets were then formed in accordance with the processes described in Example 1, and tensile strength was measured in accordance with the processes described in Example 1. Average tensile strength of the pellets is shown in Table IV.

TABLE IV

| | Tensile Strength (psi) |
|---|---|
| Mixture 13 | 10.6 |
| Mixture 14 | 7.88 |
| Mixture 15 | 5.40 |
| Mixture 16 | 8.63 |

As shown, the average tensile strength of the pellets formed from the mixtures having nanoparticles was observed to be greater than the tensile strength of either of Sample A or Sample B in Example 1. More particularly, the average tensile strength of the pellets formed from the mixtures with nanoparticles having a hydrophilic surface was observed to be greater than the tensile strength of either of Sample A or Sample B in Example 1. Tensile strength of the pellets formed from Mixture 15 having nanoparticles with hydrophobic surfaces was observed to be less than the tensile strength of both of Sample A or Sample B in Example 1. As such, silica soot compacts formed from silica soot including nanoparticles having hydrophilic surfaces has a greater tensile strength than silica soot compacts formed from silica soot having no nanoparticle additives.

Example 6

Mixtures 17-20, which included different concentrations of the nanoparticles described in Example 1, were formed by placing the silica soot particles and the nanoparticles in an Acoustic Mixer for a period of about 1.0 minute. Silica soot particles of Sample C discussed in Example 2 were used for purposes of comparison. For each of Mixtures 17-20 and Sample C, a set of eighteen pellets were formed in accordance with the process described in Example 1. For each set of eighteen pellets, nine pellets were formed using a pressing pressure of 200 psi and nine pellets were formed using a pressing pressure of 510 psi. The nine pellets formed at each pressing pressure were then subjected to the following: three pellets formed at each pressing pressure were subjected to no additional processing; three pellets formed at each pressing pressure were heated to a temperature of about 200° C. for about 10 hours, then cooled to room temperature; and three pellets formed at each pressing pressure were heated to a temperature of about 500° C. for about 10 hours, then cooled to room temperature. Table V shows nanoparticle concentration, measured BET surface area and moisture level for Mixtures 17-20 and Sample C.

TABLE V

| | Nanoparticle Concentration (wt. %) | Measured BET Surface Area (m²/g) | Moisture Level (wt. %) |
|---|---|---|---|
| Sample C | 0 | 21.14 | 0.21 |
| Mixture 17 | 3.0 | 31.16 | 0.38 |
| Mixture 18 | 6.0 | 42.80 | 0.48 |
| Mixture 19 | 10 | 55.76 | 0.69 |
| Mixture 20 | 15 | 71.87 | 0.85 |

As shown, the increasing concentration of the nanoparticles correlates to a linear increase of both surface area and moisture level of the mixtures.

Figure 5:
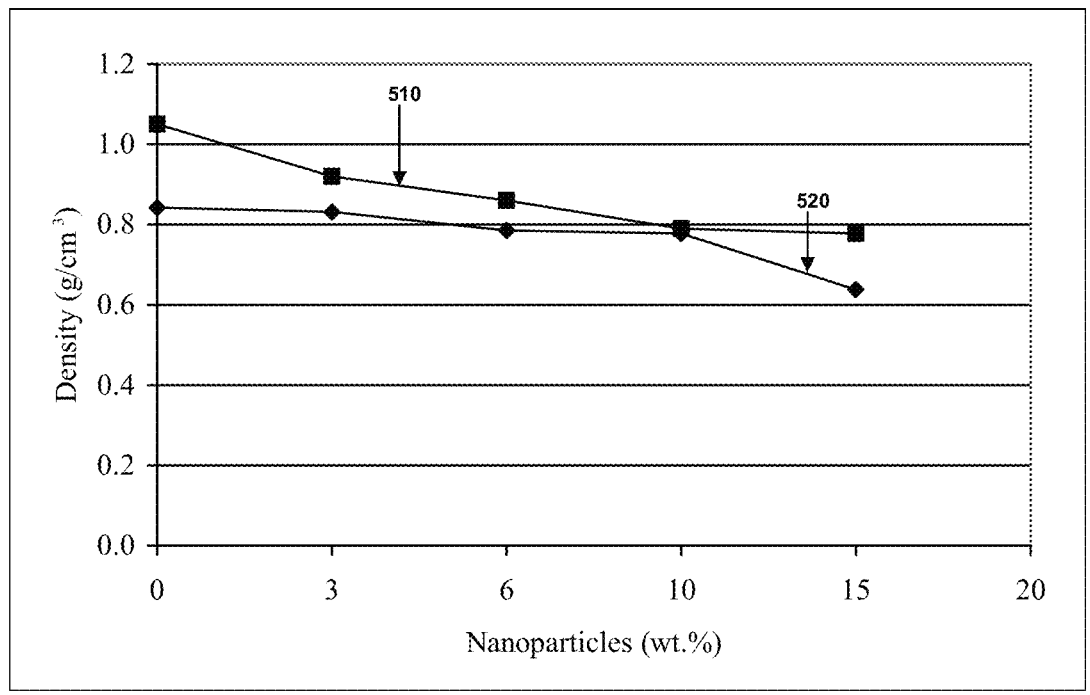
FIG. 5 is a graph showing average pellet density of silica soot pellets in accordance with the present disclosure.

FIG. 5 is a graph showing average pellet density for Mixtures 17-20 and Sample C. Line 510 shows density of pellets formed using a pressing pressure of 200 psi, and Line 520 shows density of pellets formed using a pressing pressure of 510 psi. FIG. 5 shows a similar trend of decreasing density with increasing nanoparticle concentration as is shown in FIG. 3 and described in Example 3. FIG. 5 also shows that the density of pellets formed using a pressing pressure of 510 psi is greater than the density of pellets having the same nanoparticle concentration formed using a pressing pressure of 200 psi.

Figure 6:
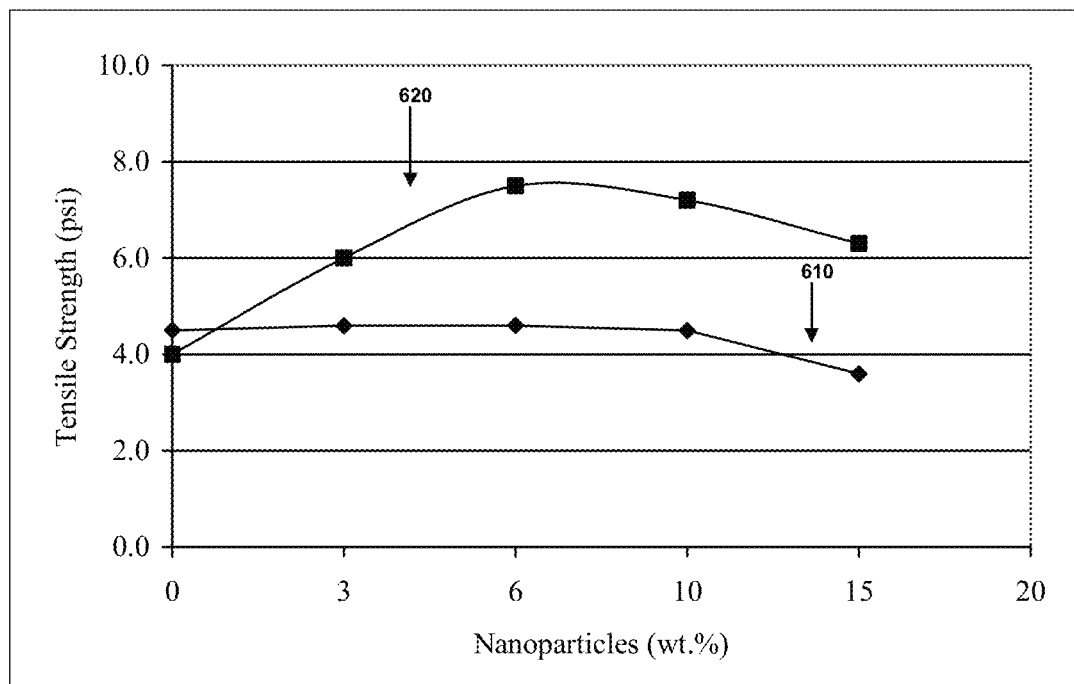
FIG. 6 is a graph showing average tensile strength of silica soot pellets in accordance with the present disclosure.
Figure 7:
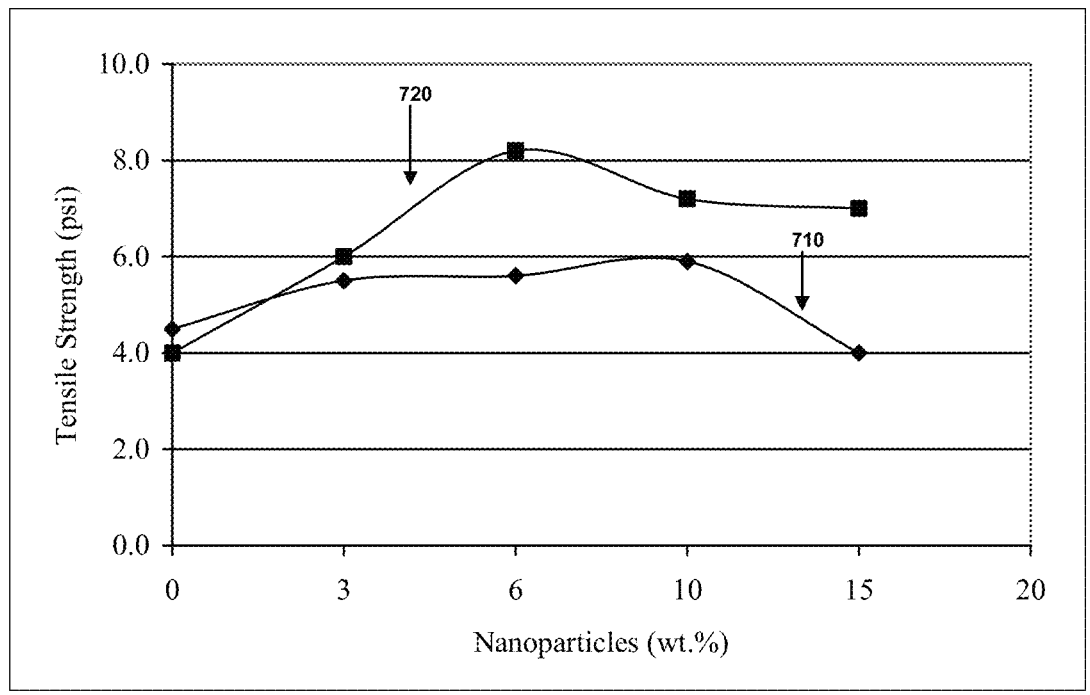
FIG. 7 is a graph showing average tensile strength of silica soot pellets in accordance with the present disclosure.
Figure 8:
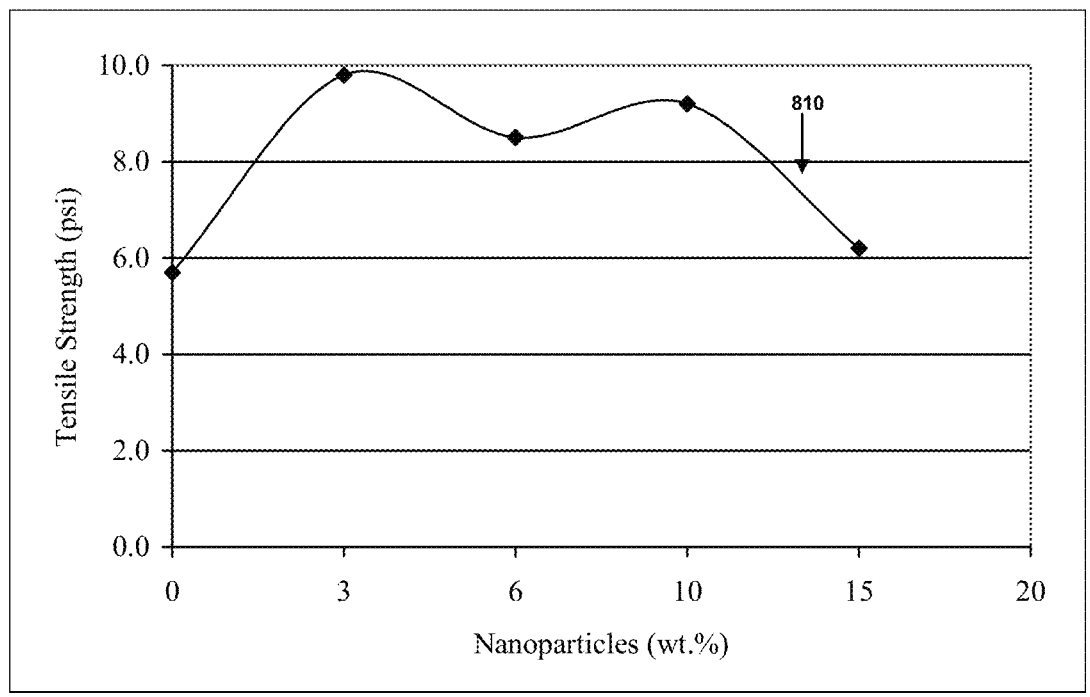
FIG. 8 is a graph showing average tensile strength of silica soot pellets in accordance with the present disclosure.

FIGS. 6-8 are graphs showing average tensile strength for Mixtures 17-20 and Sample C. FIG. 6 shows average tensile strength for the pellets subjected to no additional processing with Line 610 showing average tensile strength of pellets formed using a pressing pressure of 200 psi, and Line 620 showing average tensile strength of pellets formed using a pressing pressure of 510 psi. As shown, pellets formed using a pressing pressure of 510 psi exhibited increased tensile strength with increased nanoparticle concentration, with Mixture 18 (having an about 6.0 wt. % nanoparticle concentration) exhibiting the greatest tensile strength. However, the pellets formed using a pressing pressure of 200 psi exhibited only slight increases in tensile strength with increased nanoparticle concentration.

FIG. 7 shows average tensile strength for the pellets heated to a temperature of about 200° C. with Line 710 showing average tensile strength of pellets formed using a pressing pressure of 200 psi, and Line 720 showing average tensile strength of pellets formed using a pressing pressure of 510 psi. As shown, pellets formed using a pressing pressure of 510 psi and a pressing pressure of 200 psi exhibited increased tensile strength with increased nanoparticle concentration. For pellets formed using a pressing pressure of 510 psi, Mixture 18 (having an about 6.0 wt. % nanoparticle concentration) exhibited the greatest tensile strength. For pellets formed using a pressing pressure of 200 psi, Mixture 17 (having an about 3.0 wt. % nanoparticle concentration) Mixture 18 (having an about 6.0 wt. % nanoparticle concentration) and Mixture 19 (having an about 10 wt. % nanoparticle concentration) exhibited similar increases in tensile strength as compared to Sample C.

FIG. 8 shows average tensile strength for the pellets heated to a temperature of about 500° C., with Line 810 showing average tensile strength of pellets formed using a pressing pressure of 200 psi. As shown, pellets formed using a pressing pressure of 200 psi exhibited increased tensile strength with increased nanoparticle concentration, with Mixture 17 (having an about 3.0 wt. % nanoparticle concentration) and Mixture 19 (having an about 10 wt. % nanoparticle concentration) exhibiting similar increases in tensile strength as compared to Sample C.

Figure 9:
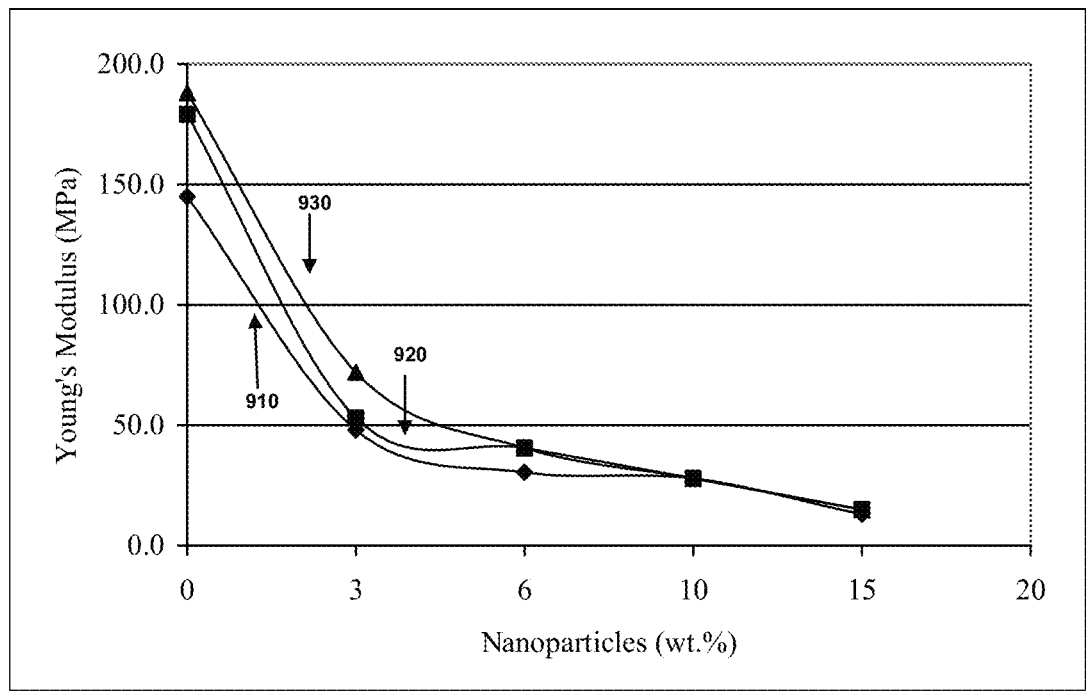
FIG. 9 is a graph showing average Young's modulus of silica soot pellets in accordance with the present disclosure.

FIG. 9 is a graph showing average Young's modulus for Mixtures 17-20 and Sample C for pellets formed using a pressing pressure of 200 psi. Line 910 shows average Young's modulus for the pellets subjected to no additional processing, Line 920 shows average Young's modulus for the pellets heated to a temperature of about 200° C., and Line 930 shows average Young's modulus for the pellets heated to a temperature of about 500° C. As shown, all pellets exhibited decreased Young's modulus with increased nanoparticle concentration.

Figure 10:
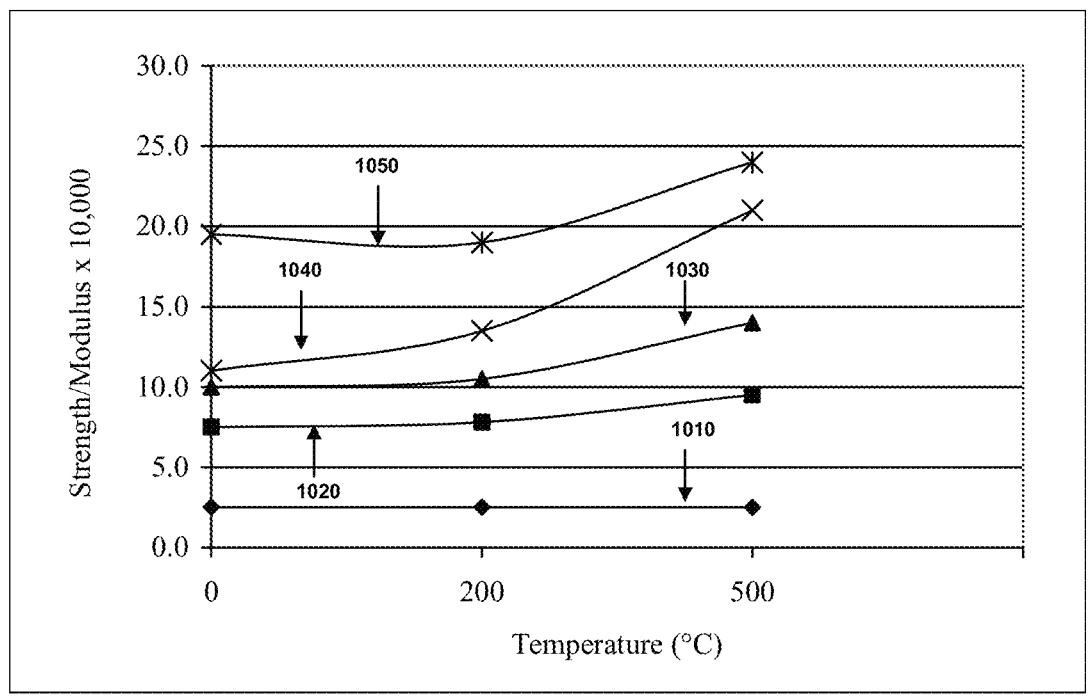
FIG. 10 is a graph showing strain tolerance of silica soot pellets in accordance with the present disclosure.

FIG. 10 is a graph showing the relationship of strain tolerance to temperature for Mixtures 17-20 and Sample C, where strain tolerance is the ratio of tensile strength to Young's Modulus. Line 1010 shows strain tolerance vs. temperature for Sample C, Line 1020 shows strain tolerance vs. temperature for Mixture 17, Line 1030 shows strain tolerance vs. temperature for Mixture 18, Line 1040 shows strain tolerance vs. temperature for Mixture 19 and Line 1050 shows strain tolerance vs. temperature for Mixture 20. As shown, all pellets exhibited increased tensile strength with the addition of nanoparticles. Furthermore, all pellets exhibited increased tensile strength with increased nanoparticle concentration. Additionally, increased tensile strength was observed as the pellets were subjected to increasing temperatures.

Example 7

A set of three preforms were formed by placing about 11.9 kg of silica soot particles into a press chamber and radially pressing the particles against an OVD substrate. The silica soot particles had a particle size of between about 0.05 micron and about 0.4 micron, a surface area of about 21 m²/g, and a moisture level of about 0.26 wt. %. The OVD substrate weight about 5.0 kg and had an outer diameter of about 110.9 mm and a soot density of about 0.57 g/cm³. The pressing pressure was increased at a ramp rate of about 5.0 psi per minute up to a maximum pressing pressure of 150 psi. The maximum pressing pressure was held for about 2.0 hours. Once pressed, the preforms had an average outer diameter of about 182.2 mm and a soot density of about 0.84 g/cm³. Each of the first set of three preforms were heated to a temperature of about 600° C. at different heating rates (about 2.5° C. per minute, about 5.0° C. per minute, and about 10° C. per minute). All three of the preforms were observed to crack during the heating of the preforms and prior to reaching about 600° C.

Example 8

A preform was formed by placing about 11.4 kg of a mixture of silica soot particles and nanoparticles into a press chamber and radially pressing the mixture against an OVD substrate. The silica soot particles had a particle size of between about 0.05 micron and about 0.4 micron, a surface area of about 21 m²/g, and a moisture level of about 0.26 wt. %. The nanoparticles were nano-silica having a particle size of about 7.0 nm. The mixture, which included about 93 wt. % silica soot particles and about 7.0 wt. % nano-silica, and had a moisture level of about 0.47 wt. %, was mixed in Acoustic Mixer. The OVD substrate weight about 5.0 kg and had an outer diameter of about 108.7 mm and a soot density of about 0.59 g/cm³. The pressing pressure was increased at a ramp rate of about 5.0 psi per minute up to a maximum pressing pressure of 150 psi. The maximum pressing pressure was held for about 2.0 hours. Once pressed, the preforms had an average outer diameter of about 183.5 mm and a soot density of about 0.77 g/cm³. The preform was heated to a temperature of about 600° C. at a heating rate about 10° C. per minute. The preform was observed to be intact and free of cracks after reaching about 600° C.

Example 9

A preform was formed in accordance with the preform described in Example 8. The preform was formed using a mixture which included about 97 wt. % silica soot particles and about 3.0 wt. % of the nano-silica described in Example 8. The preform was heated to a temperature of about 200° C. for about 24 hours and then was rapidly moved into a furnace having a temperature of about 900° C. The preform was observed to be intact and free of cracks after reaching about 900° C. The preform was then heated to a temperature above 1200° C. and sintered to form a consolidated into a glass article. The consolidated glass article was also observed to be intact and free of cracks.

It will be apparent to those skilled in the art that various modifications and variations can be made without departing from the spirit or scope of the claims.

What is claimed is:

1. A method of strengthening a silica soot compact, the method comprising:
    forming a mixture of silica soot particles and nanoparticles, the mixture comprising between about 3.0 wt % and about 30 wt % of the nanoparticles, wherein the nanoparticles have a smaller particle size than the silica soot particles, wherein the particle size of the nanoparticles is between about 6.0 nm and about 15 nm, and wherein the surface area of the nanoparticles is between about 30 m²/g and about 450 m²/g; and
    forming a silica soot compact from the mixture by pressing the silica soot particles over an outer layer of a substrate to form a cladding portion of an optical fiber preform.

2. The method of claim 1, comprising forming the mixture of the silica soot particles and the nanoparticles in the absence of a solvent.

3. The method of claim 1, further comprising humidifying at least one of the nanoparticles, the silica soot particles, and the mixture of the silica soot particles and the nanoparticles.

4. The method of claim 1, further comprising sintering the silica soot compact.

5. The method of claim 1, wherein the nanoparticles are hydrophilic.

6. The method of claim 1, wherein the nanoparticles are selected from the group consisting of silica, germanium oxide, gallium oxide, antimony oxide, arsenic oxide, bismuth oxide, indium oxide, lead oxide, phosphorus oxide, tantalum oxide, tellurium oxide, tin oxide, titanium oxide, selenium oxide, and mixtures thereof.

7. The method of claim 1, wherein the silica soot particles have a particle size of between about 0.05 micron and about 0.4 micron with an average particle size of about 0.2 micron.

8. The method of claim 1, wherein the silica, soot particles have a particulate surface area of greater than about 15 m²/g.

9. The method of claim 1, wherein the mixture of ihe silica soot particles and the nanoparticles has a bulk density of less than about 0.30 g/cm³.

10. The method of claim 1, wherein the silica soot compact has a density of less than about 1.20 g/cm³.

11. A method of forming a cladding portion of an optical fiber preform, the method comprising:
    positioning a partially manufactured optical fiber preform in an inner cavity of a mold body;
    contacting silica soot particles with nanoparticles to form a mixture, the mixture comprising between about 3.0 wt % and about 30 wt % of the nanoparticles, wherein the nanoparticles have a smaller particle size than the silica soot particles, wherein the particle size of the nanoparticles is between about 6.0 nm and about 15 nm, and wherein the surface area of the nanoparticles is between about 30 m²/g and about 450 m²/g;
    after contacting the silica soot particles with the nanoparticles, loading the mold body with the silica soot particles and the nanoparticles; and
    compressing the silica soot particles and the nanoparticles in a radial direction to form a cladding portion of a silica soot compact.

12. The method of claim 11, comprising contacting the silica soot particles with the nanoparticles in the absence of a solvent.

13. The method of claim 11, further comprising humidifying at least one of the nanoparticles, the silica soot particles, and the mixture of the silica soot particles and the nanoparticles.

14. The method of claim 11, wherein the nanoparticles are hydrophilic.

15. The method of claim 11, wherein the nanoparticles are selected from a group consisting of silica, germanium oxide, gallium oxide, antimony oxide, arsenic oxide, bismuth oxide, indium oxide, lead oxide, phosphorus oxide, tantalum oxide, tellurium oxide, tin oxide, titanium oxide, selenium oxide, and mixtures thereof.

16. The method of claim 11, wherein the silica soot particles have a particle size of between about 0.05 micron and about 0.4 micron with an average particle size of about 0.2 micron.

17. The method of claim 11, wherein the silica soot particles have a particulate surface area of greater than about 15 m²/g.

18. The method of claim 1, wherein the mixture has a moisture content between about 0.10 wt % and about 5.0 wt %.

19. The method of claim 1, wherein the silica soot compact has a Young's modulus of less than about 150 MPa.

* * * * *

UNITED STATES PATENT AND TRADEMARK OFFICE
CERTIFICATE OF CORRECTION

PATENT NO. : 10,793,466 B2  
APPLICATION NO. : 15/052309  
DATED : October 6, 2020  
INVENTOR(S) : Joel Edward Clinton et al.

Page 1 of 1

It is certified that error appears in the above-identified patent and that said Letters Patent is hereby corrected as shown below:

In the Claims

In Column 13, Line 38, Claim 2, delete "claim 1," and insert -- claim 1, further --, therefor.

In Column 14, Line 1, Claim 8, delete "silica," and insert -- silica --, therefor.

In Column 14, Line 3, Claim 9, delete "ihe" and insert -- the --, therefor.

In Column 14, Line 13, Claim 11, delete "mixure," and insert -- mixture, --, therefor.

In Column 14, Line 27, Claim 12, delete "claim 11," and insert -- claim 11, further --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*